(12) United States Patent
Takashima et al.

(10) Patent No.: US 11,024,200 B2
(45) Date of Patent: Jun. 1, 2021

(54) CONTENT FORMAT CONVERSION VERIFICATION

(71) Applicants: Sony Corporation, Tokyo (JP); Sony Pictures Entertainment Inc, Culver City, CA (US)

(72) Inventors: Yoshikazu Takashima, Los Angeles, CA (US); Spencer Stephens, Studio City, CA (US)

(73) Assignees: Sony Corporation, Tokyo (JP); Sony Pictures Entertainment, Inc., Culver City, CA (US)

( * ) Notice: Subject to any disclaimer, the term of this patent is extended or adjusted under 35 U.S.C. 154(b) by 80 days.

(21) Appl. No.: 14/815,720

(22) Filed: Jul. 31, 2015

(65) Prior Publication Data

US 2016/0036885 A1    Feb. 4, 2016

Related U.S. Application Data

(60) Provisional application No. 62/032,372, filed on Aug. 1, 2014.

(51) Int. Cl.
| | | |
|---|---|---|
| G09C 5/00 | (2006.01) | |
| H04L 9/32 | (2006.01) | |
| H04L 29/08 | (2006.01) | |

(52) U.S. Cl.
CPC .............. *G09C 5/00* (2013.01); *H04L 9/3239* (2013.01); *H04L 67/2823* (2013.01); *H04L 67/2895* (2013.01); *H04L 2209/60* (2013.01); *H04L 2209/608* (2013.01)

(58) Field of Classification Search
CPC . H04L 65/602; H04L 9/3239; H04L 67/2823; H04L 67/2895; H04L 2209/60; H04L 2209/608

USPC ......................................................... 709/246
See application file for complete search history.

(56) References Cited

U.S. PATENT DOCUMENTS

| | | | |
|---|---|---|---|
| 6,223,272 | B1 | 4/2001 | Coehlo et al. |
| 6,418,223 | B1 | 7/2002 | Wootton et al. |
| 6,460,163 | B1 | 10/2002 | Bowman et al. |
| 6,826,315 | B1 | 11/2004 | Wickes |
| 7,454,542 | B2 | 11/2008 | Illowsky et al. |

(Continued)

FOREIGN PATENT DOCUMENTS

| | | |
|---|---|---|
| EP | 1001368 A2 | 5/2000 |
| JP | 2002542523 A | 12/2002 |

(Continued)

OTHER PUBLICATIONS

International Search Report issued in co-pending PCT Application No. PCT/US15/43325 dated Oct. 30, 2015 in 2 pages.

(Continued)

*Primary Examiner* — David R Lazaro
*Assistant Examiner* — Zia Khurshid
(74) *Attorney, Agent, or Firm* — Procopio, Cory, Hargreaves & Savitch LLP

(57) ABSTRACT

Content conversion verification, includes: converting, at a first computer system, an original content file to a target format, generating a converted content file in the target format; generating a checksum for the converted content file; and sending the original content file and the checksum to a second computer system. Key words include content verification and checksum.

23 Claims, 15 Drawing Sheets

(56) References Cited

U.S. PATENT DOCUMENTS

| | | |
|---|---|---|
| 8,266,182 B2 | 9/2012 | Wanigasekara-Mohotti et al. |
| 2001/0036271 A1 | 11/2001 | Javed |
| 2005/0125660 A1 | 6/2005 | Raciborski |
| 2005/0216815 A1 | 9/2005 | Novotny et al. |
| 2008/0016358 A1* | 1/2008 | Filreis .................. H04L 9/3247 713/176 |
| 2008/0244686 A1* | 10/2008 | Li ........................ G06F 21/565 726/1 |
| 2009/0286560 A1* | 11/2009 | Willis ............... G06F 17/30017 455/466 |
| 2009/0307748 A1* | 12/2009 | Blom ..................... G06F 21/31 726/2 |
| 2010/0091659 A1* | 4/2010 | O'Hanlon ............. H04L 43/062 370/241 |
| 2011/0093941 A1* | 4/2011 | Liu ........................ H04W 8/18 726/7 |
| 2012/0041931 A1* | 2/2012 | Ross ...................... G06F 21/64 707/693 |

FOREIGN PATENT DOCUMENTS

| | | |
|---|---|---|
| JP | 2007274716 A | 10/2007 |
| JP | 2008067152 A | 3/2008 |
| JP | 2008-146712 | 6/2008 |
| JP | 2009-059234 | 3/2009 |
| JP | 2010273025 A | 12/2010 |
| WO | 0007329 A | 2/2000 |

OTHER PUBLICATIONS

Extended European Search Report for PCT/US2015043325 dated Jan. 26, 2018, 8 pages.

Office Action for related Korean Patent Application No. 10-2017-7001283 dated May 17, 2018 in 5 pages.

Office Action for related Japanese Patent Application No. 2017-526485, dated Oct. 30, 2019, in 8 pages.

* cited by examiner

100

Logical Structure

File System Layer Structure       150

CONTENT FORMAT CONVERSION VERIFICATION

CROSS-REFERENCE TO RELATED APPLICATIONS

This application claims the benefit of priority under 35 U.S.C. § 119(e) of U.S. Provisional Patent Application No. 62/032,372, filed Aug. 1, 2014, entitled "Checksum based Content Format Conversion Verification." The disclosure of the above-referenced application is incorporated herein by reference.

BACKGROUND

Field of the Invention

The present disclosure relates to content format conversion verification, and more specifically, to checksum-based content format conversion verification.

Background

As the quality of audiovisual (AV) content improves, and the file size of AV content becomes larger, secondary use of already distributed AV content data becomes one of the options to expand content consumption. Depending on the playback system, supported AV content file formats are different. To re-use the same quality of video and audio data in the original distribution file, a file format conversion process can be used.

SUMMARY

The present disclosure provides for content conversion verification.

In one implementation, a method for content conversion verification is disclosed. The method includes: converting, at a first computer system, an original content file to a target format, generating a converted content file in the target format; generating a checksum for the converted content file; and sending the original content file and the checksum to a second computer system.

In another implementation, a method for content conversion verification is disclosed. The method includes: receiving, at a first computer system, an original content file and a checksum from a second computer system; converting, at the first computer system, the original content file to a target format, generating a converted content file in the target format; generating, at the first computer system, a new checksum for the converted content file; and comparing, at the first computer system, the received checksum and the new checksum.

In another implementation, an apparatus for content conversion verification is disclosed. The apparatus includes: means for receiving, at a first computer system, an original content file and a checksum from a second computer system; means for converting, at the first computer system, the original content file to a target format, generating a converted content file in the target format; means for generating, at the first computer system, a new checksum for the converted content file; and means for comparing, at the first computer system, the received checksum and the new checksum.

In another implementation, a non-transitory computer-readable medium storing a computer program to verify content conversion is disclosed. The computer program includes executable instructions that cause a computer to: receive, at a first computer system, an original content file and a checksum from a second computer system; convert, at the first computer system, the original content file to a target format, generating a converted content file in the target format; generate, at the first computer system, a new checksum for the converted content file; and compare, at the first computer system, the received checksum and the new checksum.

In yet another implementation, an apparatus is disclosed. The apparatus includes: a processor; and memory connected to the processor, the memory storing a computer program to verify content conversion, the computer program comprising instructions executable by the processor that cause the apparatus to: receive an original content file and a checksum from a computer system; convert the original content file to a target format, generating a converted content file in the target format; generate a new checksum for the converted content file; and compare the received checksum and the new checksum.

Other features and advantages of the present disclosure should be apparent from the present description which illustrates, by way of example, aspects of the disclosure.

BRIEF DESCRIPTION OF THE DRAWINGS

The details of the present disclosure, both as to its structure and operation, may be gleaned in part by study of the appended further drawings, in which like reference numerals refer to like parts, and in which.

DETAILED DESCRIPTION

Figure 1:
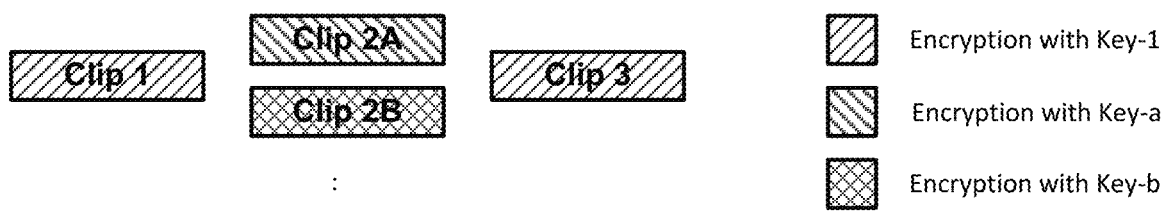
FIG. 1 shows a logical structure and a file system layer structure of a process for content conversion verification in accordance with one implementation of the present disclosure.
Figure 1:
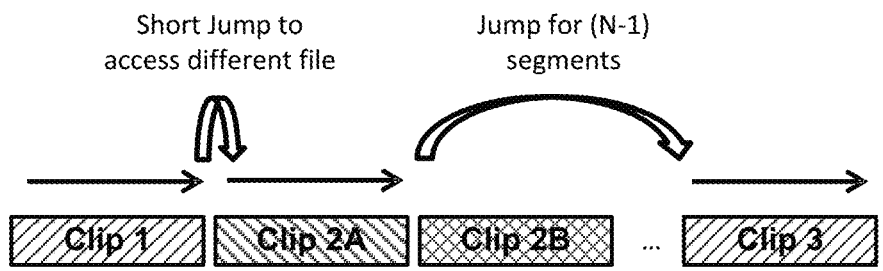

As stated above, secondary use of already distributed AV content data becomes one of the options to expand content consumption. To re-use the same quality of video and audio data in the original distribution file, a file format conversion process can be used. For example, a Moving Picture Experts Group Transport Stream (MPEG-TS), including video and audio, may be transformed to an International Organization for Standardization (ISO) MPEG-4, Part 14 (MP4) file format, without transcoding the video and audio elementary stream. In another example, an MP4 file format stream may be converted to an MPEG-TS stream. It should be noted that an MP4 format is a representative format based on the video frame-based multiplexing file format, while an MPEG-TS is a representative format based on the fixed-size packet multiplexing file format.

Certain implementations as disclosed herein teach techniques for content conversion verification. In one implementation, the results of content format conversion are verified using checksums. In one example, a content file is prepared and stored in a first format in a first computer system (such as a content provider server). The system creates a checksum for the file in a target format. The content file and the checksum are distributed together. A second computer system (such as an end user player or client system) receives the file and checksum, and then converts the content file to the target format. The second system creates a local checksum for the file in the target format. The second system can then compare the received checksum and the local checksum to verify that the conversion was successful (or at least acceptable). Additional implementations can include, but are not limited to, one or more of the following items: (1) File format conversion with or without re-encryption; (2) Supporting forensic watermarking in the content file; (3) Checking the checksum during/after the conversion; and (4) Conversion, such as converting from "frame base" to "fixed packet size" and from "fixed packet size" to "frame base", with or without "decryption and re-encryption process". Although references to term "checksum" are used throughout the present disclosure, the term can be used to refer to any block of digital data for the purpose of detecting errors and verifying data integrity (including, but not limited to, the results of checksum functions (e.g., the UNIX cksum function), hash functions, and fingerprint functions.

In a further implementation, the file to be converted into the target format is segmented (or chunked) into a plurality of segments (or chunks). Thus, the checksum generation and comparison can be performed during the conversion process. In one implementation, the checksum generation and comparison can be performed for each segment during the conversion process. In another implementation, the checksum generation and comparison can be performed over a predetermined number of segments during the conversion. In yet another implementation, the checksum generation and comparison can be performed after the completion of the conversion process.

In a further implementation, the checksum is generated against the conversion output data from the beginning and up to the multiple checksum check points. Thus, the checksum generation and comparison can be performed during the conversion process while verifying the correctness of conversion output from the beginning to the associated checksum check points. In one implementation, the checksum generation continues to run from the beginning of conversion output data to the current conversion output data, and comparison can be performed for the output data from the beginning up to the current output data during the conversion process. In another implementation, the checksum generation and comparison can be performed in the same manner (from the beginning up to the current conversion output data) and checksum comparison can be performed after the completion of the conversion process.

After reading this description it will become apparent how to implement the disclosure in various implementations and applications. However, although various implementations of the present disclosure will be described herein, it is understood that these implementations are presented by way of example only, and not limitation. As such, this detailed description of various implementations should not be construed to limit the scope or breadth of the present disclosure.

FIG. 1 shows a logical structure 100 and a file system layer structure 150 of a process for content conversion verification in accordance with one implementation of the present disclosure. The logical structure 100 and file system layer structure 150 include clips 1, 2A, 2B, and 3 which are each collections of video data (video clips; in other implementations, different collections of data can be used, such as audio data). As shown in the logical structure 100, clips 1 and 3 are encrypted with Key-1, while clip 2 is encrypted with Key-a and Key-b. Clip 2 encrypted with Key-A is labeled Clip 2A while clip 2 encrypted with Key-B is labeled Clip 2B. The encrypted clips are placed in sequence as an encrypted file and prepared for distribution (e.g., stored on an optical disc or in an online distribution storage server). As shown in the file system layer structure 150, the clip encrypted with Key-a (i.e., Clip 2A) and the clip encrypted with Key-b (i.e., Clip 2B) are placed next to each other, in sequence.

In one implementation, to verify that file format conversion implementation created correct output data without errors, a checksum against correct file format conversion output data is created at content preparation process. The check sum data is provided together with the original content distribution. Examples of checksums include hash value calculation result of output files, such as message digest 5 (MD5), secure hash algorithm 1 (SHA-1), and SHA-256.

Figure 2A:
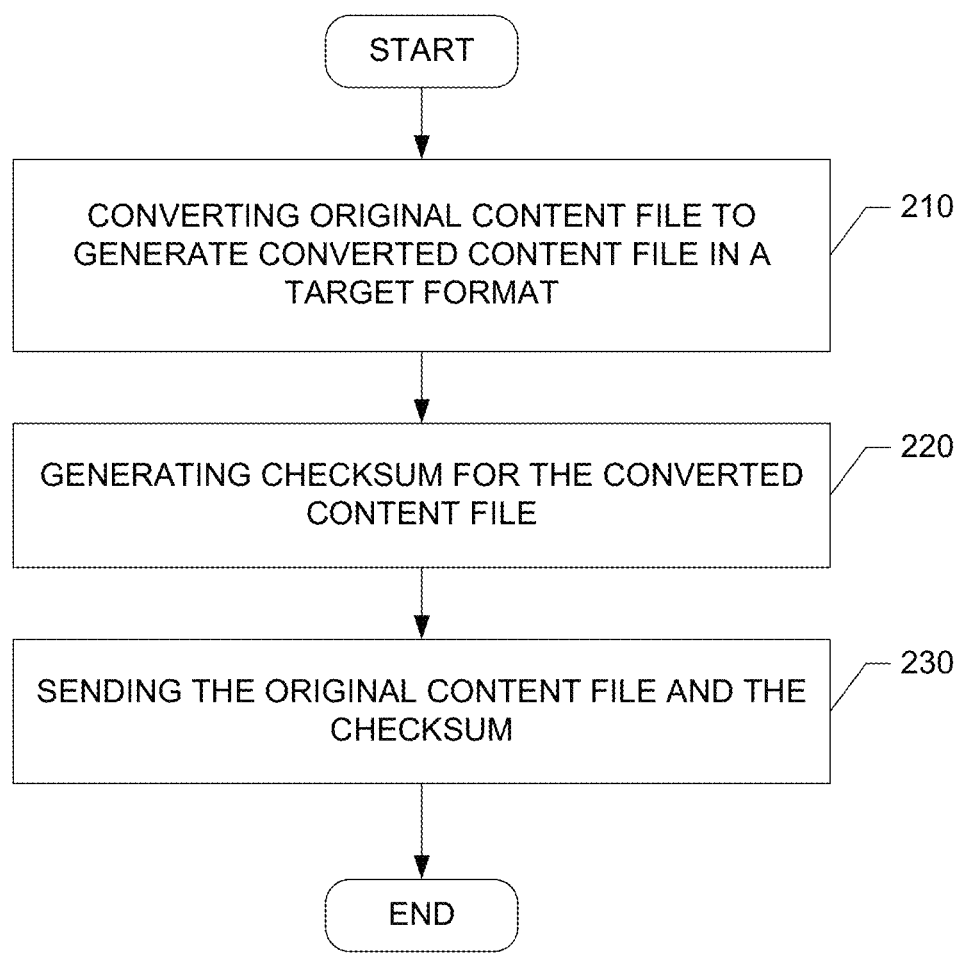
FIG. 2A is a flow diagram illustrating a process for content conversion verification in accordance with one embodiment of the present disclosure.

FIG. 2A is a flow diagram illustrating a process 200 for content conversion verification in accordance with one embodiment of the present disclosure. In the illustrated embodiment of FIG. 2A, an original content file is converted (at a first computer system) to a target format, at block 210. The conversion creates a converted content file in the target format. A checksum for the converted content file is generated, at block 220. The original content file and the checksum are then sent to a second computer system, at block 230.

In one file format conversion implementation, an apparatus is configured as a computer system, wherein the computer system receives a file and a checksum. After converting the file, the system calculates a checksum of its own file format conversion output data (either during or after the conversion process). The system then compares the calculated checksum with the checksum prepared by and received from the content distributor (e.g., the first computer system). If the checksums match, the output data created by the receiving system is verified to be correct. In this way, in at least some implementations, verification of file format conversion output file will become easier and more efficient. In addition, checksum supported file format conversion output data verification is also applicable when content is encrypted in the original file, and content decryption and re-encryption occurs during the file conversion process (when the encryption key of conversion output data is pre-determined). Checksum supported file format conversion output data is also applicable when the original file and/or file format conversion output file include individualized video segments (e.g., forensic watermarking). In one implementation, the apparatus is a media player.

Figure 2B:
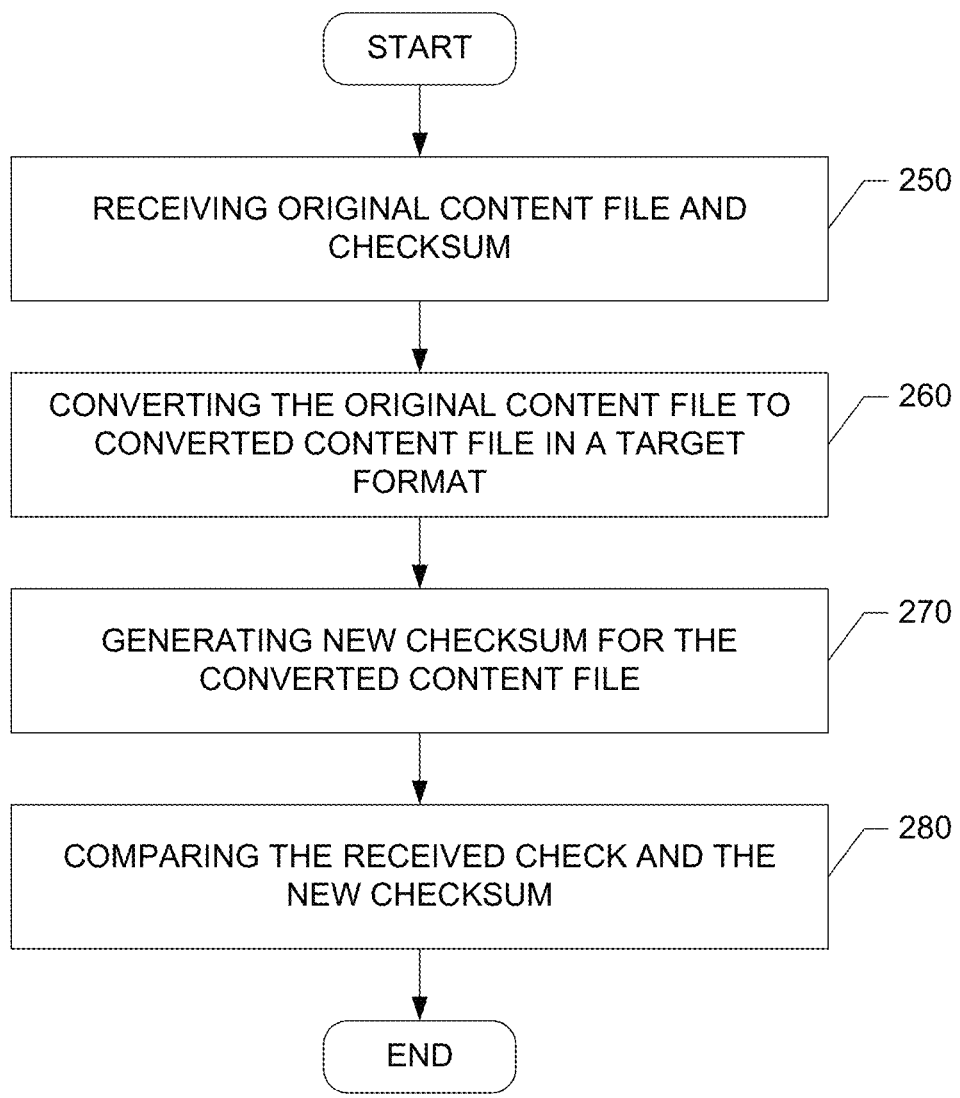
FIG. 2B is a flow diagram illustrating a process for content verification in accordance with one embodiment of the present disclosure.

FIG. 2B is a flow diagram illustrating a process 200 for content verification in accordance with one embodiment of the present disclosure. In the illustrated embodiment of FIG. 2B, an original content file and a checksum is received at a first computer system from a second computer system, at block 250. The original content file is converted to a target format, at block 260. The conversion creates a converted content file in the target format. A new checksum is generated, at block 270, for the converted content file. The received checksum and the new checksum are then compared, at block 280.

In an example of operation in one implementation, a content file is a video file including video data. The video data is divided into frames (literally and/or logically). The content file has a fixed packet size (e.g., MPEG-TS+4 byte header=192 byte packets) and is encrypted (e.g., Video/Audio elementary stream (ES) layer encryption). The content file is to be converted to a conversion file that has a frame base file format (e.g., ISO Base Media File Format, single track files) and is encrypted (e.g., Video/Audio ES layer encryption, Common Encryption). A content provider, using a provider computer system storing the original content file, converts the original content file to a converted file and creates a checksum for the converted file (a "provider checksum"). The content provider distributes the original content file with the provider checksum.

In one implementation, an apparatus is configured as a client system receiving the original content file and the provider checksum (e.g., an interface unit) and storing the file and the checksum in a storage unit. The client system converts the original content file to a target format in a converted file (e.g., a converter). The client system does not decrypt the content file. The client system then creates a new checksum using the converted file (e.g., a checksum generator). Alternatively, the client system creates the new checksum during the conversion process. The client system compares the provider checksum (received with the original file) with the new checksum (created by the client system) (e.g., by a checksum comparator). If the checksums match, the client system has confirmed that the conversion was successful. In one implementation, the client system generates a verification flag when the received checksum and the new checksum match. If the conversion was not successful, the client system can report the failure and request a new file and/or checksum from the provider. Alternatively, the client system can send the new checksum to the provider system for that system to verify. In one implementation, the client system is a media player.

FIGS. 3 through 14 illustrate various media formats and conversions such as conversion from "frame base" to "fixed packet size" and from "fixed packet size" to "frame base", with or without "decryption and re-encryption process".

Figure 3:
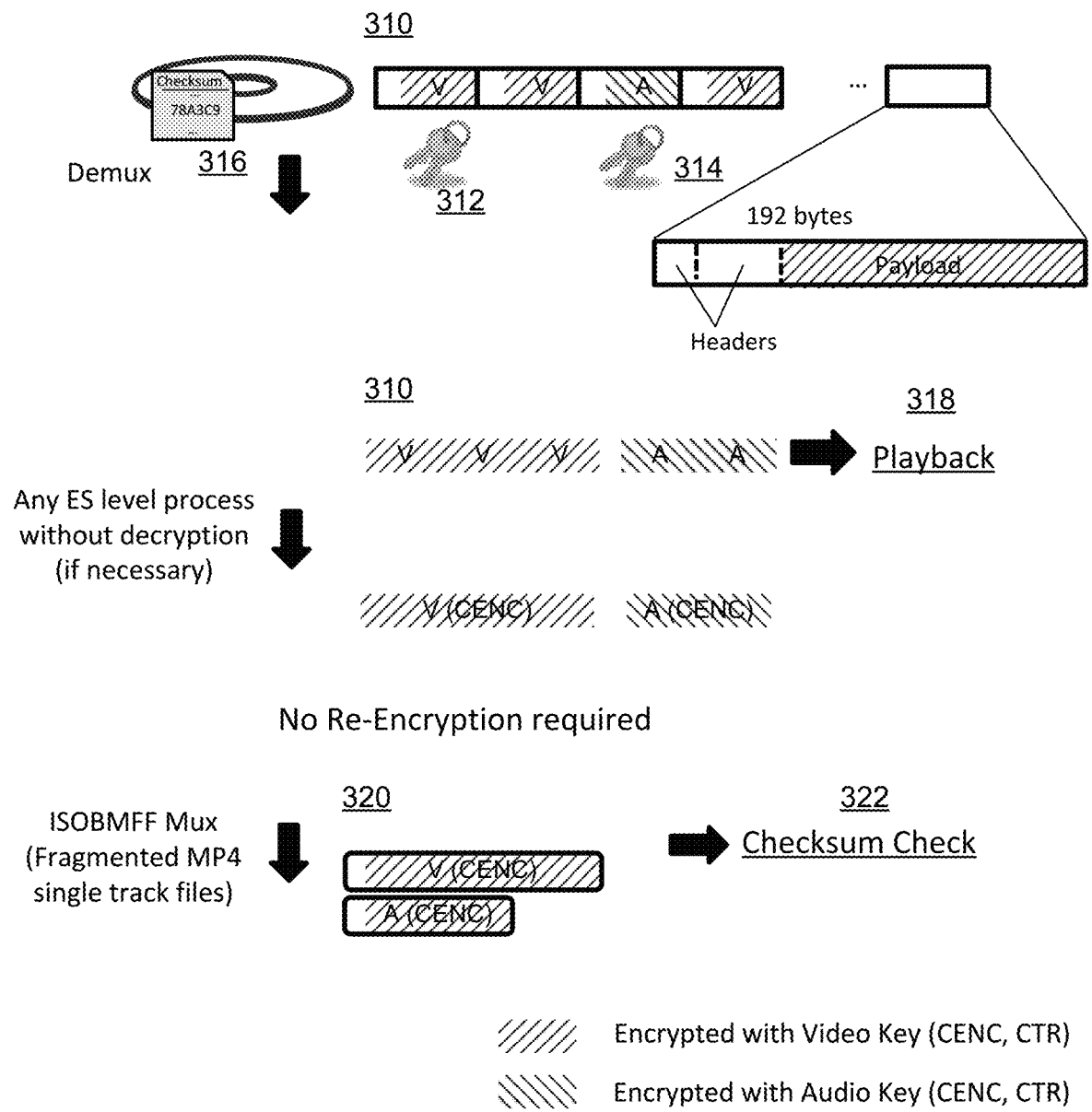
FIG. 3 is an illustration in which the original file uses the "fixed-size packet" format with video and audio ES layer encryption.
Figure 4:
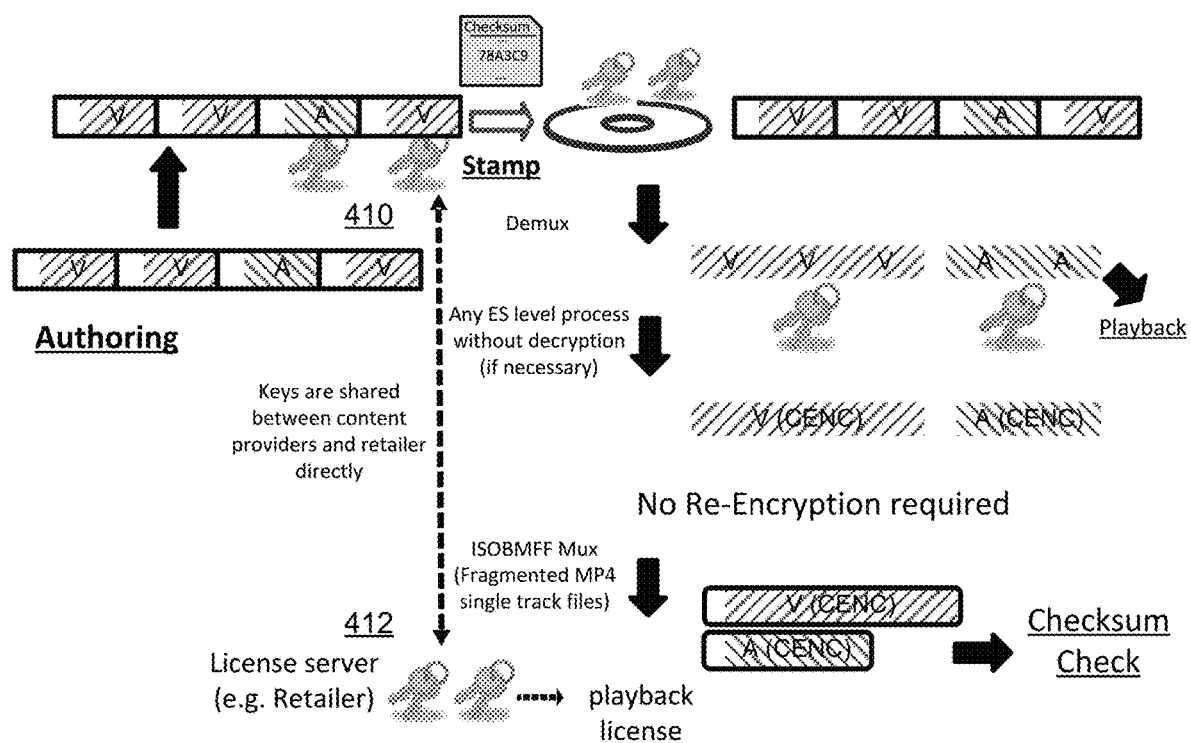
FIG. 4 is an illustration showing how the format conversion is performed without content decryption and re-encryption process for the case in which the original file uses the "fixed-size packet" format with video and audio ES layer encryption.

FIGS. 3 and 4 illustrate the details of the file format conversion without re-encryption.

FIG. 3 is an illustration 300 in which the original file 310 uses the "fixed-size packet" format (e.g., MPEG-TS plus a four-byte header equal to 192 byte packets) with video and audio ES layer encryption (e.g. Common Encryption). In FIG. 3, a content preparation process (residing on a first computer system) runs a file format conversion process to convert the original file 310 into a "frame base" format (e.g. ISO Base Media File Format (ISOBMFF)) with video encryption using a video encryption key 312 and audio encryption using an audio encryption key 314. The content preparation process also runs a checksum calculation process to generate a checksum 316. The original file 310 (with video and audio encryption) and the checksum 316 are then sent to a second computer system. In one implementation, the first computer system is a content provider server and the second computer system is a client device.

The second computer system receives the original file 310 (with video and audio encryption) and the checksum 316. The received original file 310 can be used for playback 318. Further, a file format conversion process residing on the second computer system is then run to convert the original file 310 into an output file 320 with video and audio ES layer encryption. The file format conversion process of the second computer system calculates a checksum of its own file format conversion output data (either during or after the conversion process) and compares 322 the calculated checksum with the checksum prepared by and received from the first computer system. If the checksums match, the output file 320 generated by the second computer system is verified to be correct. If the comparison did not result in a match of the checksums, the client system can report the failure and request a new file and/or checksum from the provider. Alternatively, the client system can send the new checksum to the provider system for that system to verify.

FIG. 4 is an illustration 400 of the file format conversion without re-encryption, which is similar to the illustration 300 shown in FIG. 3, but with added illustrations showing how the content playback keys are to be managed. In FIG. 4, the keys are shared between a content provider server 410 and a license server (e.g., retailer) 412. The other elements in FIG. 4 are similar to those of FIG. 3.

Figure 5:
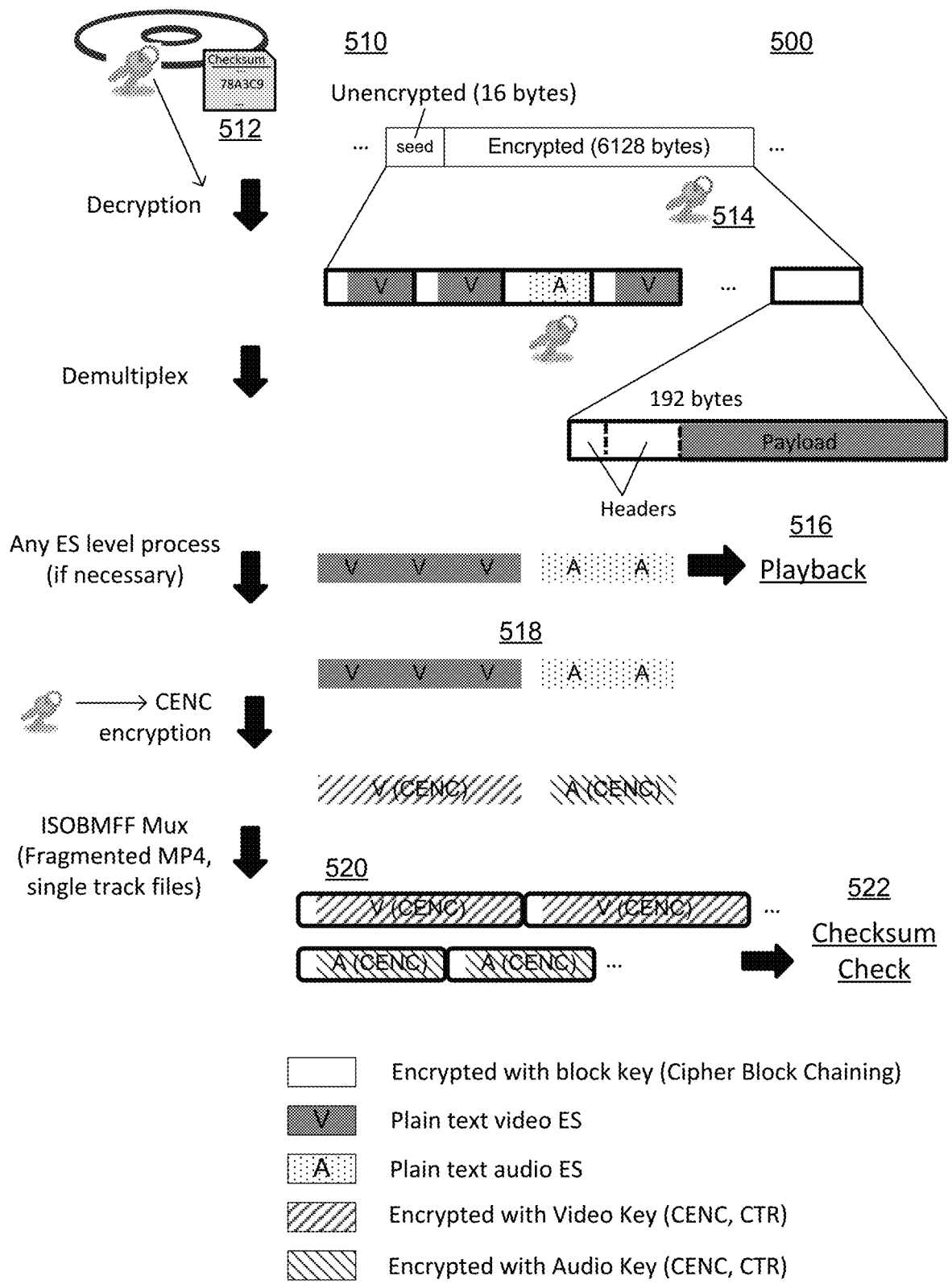
FIG. 5 is an illustration in which the original file 510 uses the "fixed-size packet" format with fixed-size block cipher encryption.
Figure 6:
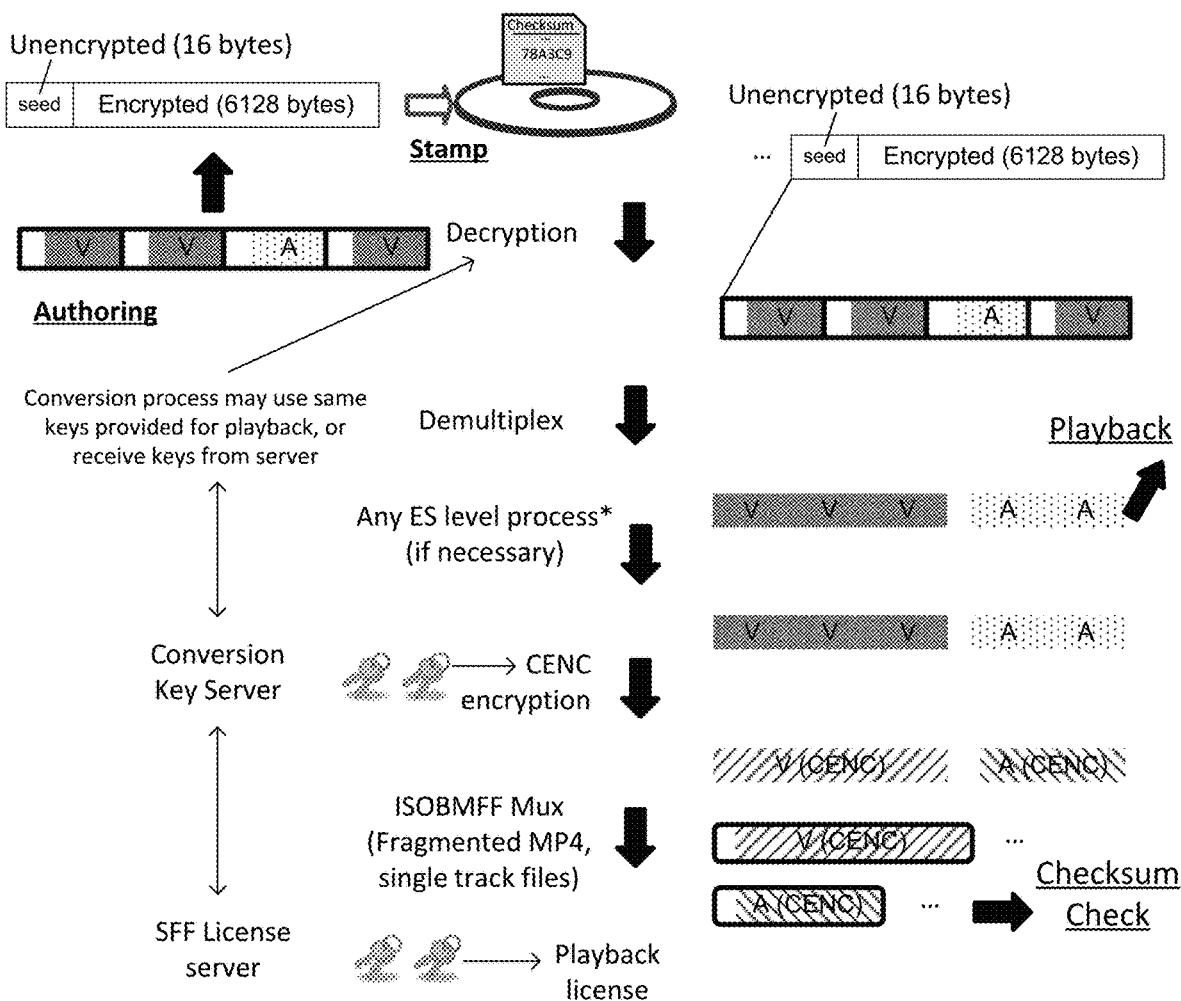
FIG. 6 is an illustration showing how the format conversion is performed with content decryption and re-encryption process for the case in which the original file uses the "fixed-size packet" format with fixed-size block cipher encryption.

FIGS. 5 and 6 illustrate the details of the file format conversion with re-encryption.

FIG. 5 is an illustration 500 in which the original file 510 uses the "fixed-size packet" format (e.g., MPEG-TS plus a four-byte header equal to 192 byte packets). In FIG. 5, a content preparation process (residing on a first computer system) runs a file format conversion process to convert the original file 510 into a "frame base" format (e.g. ISO Base Media File Format (ISOBMFF)). The content preparation process also runs a checksum calculation process to generate a checksum 512. The original file 510 is encrypted with a block key 514 (cipher block chaining (CBC); example of Advance Access Content System (AACS) for Blu-ray disc). The original file 510 and the checksum 512 are then sent to a second computer system.

The second computer system receives the original file 510 and the checksum 512. The received original file 510 can be used for playback 516. Further, a file format conversion process residing on the second computer system is then run. However, in this case, video and audio files are re-encrypted to generate the encrypted video and audio files 520. The file format conversion process of the second computer system calculates a checksum of its own file format conversion output data (either during or after the conversion process) and compares 522 the calculated checksum with the checksum prepared by and received from the first computer system. If the checksums match, the output file 520 generated by the second computer system is verified to be correct. If the comparison did not result in a match of the checksums, the client system can report the failure and request a new file and/or checksum from the provider. Alternatively, the client system can send the new checksum to the provider system for that system to verify.

FIG. 6 is an illustration 600 of the file format conversion with re-encryption, which is similar to the illustration 500 shown in FIG. 5, but with added illustrations showing how the content playback keys are to be managed. In FIG. 6, the conversion process may use the same keys provided for playback or receive keys from the server. The conversion keys are generated using the original key or are generated independently.

Figure 7:
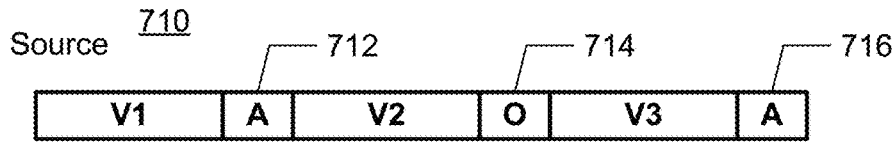
FIG. 7 is an illustration of a media format (with multi-plexed video, audio, and other data units) in a frame base in accordance with one implementation.
Figure 7:
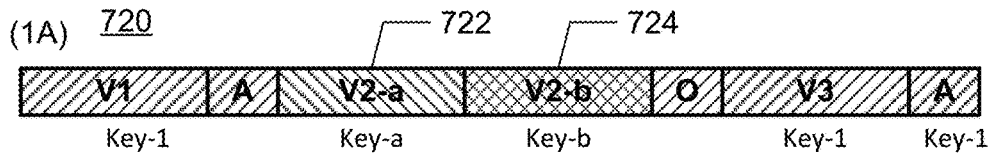
Figure 7:
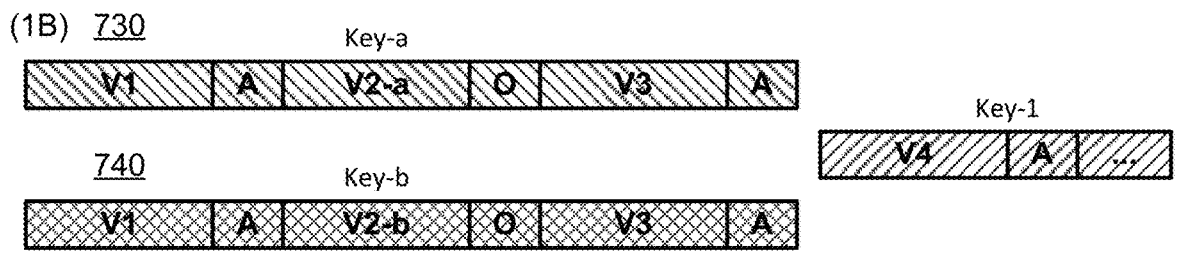

FIG. 7 is an illustration 700 of a media format (with multiplexed video, audio, and other data units) in a frame base in accordance with one implementation. The multiplexing is applied by video/audio frame basis or larger block such as a video group of pictures (GOP) (e.g., an MPEG-4 (MP4) format or Common File Format (CFF)). In this implementation, the individualization can be applied by frame basis (or larger units).

Source frames in elementary stream (ES) 710 include three video data units V1, V2, V3, two audio units 712, 716, and one other data unit 714. Frames in ES 720 (stream 1A) include two V2 frames 722, 724 (frames V2-a, V2-b) encrypted with Key-a and Key-b, respectively. In case encryption is also applied by frame basis, encryption does not affect selection of individualization segment. In stream 1A 720, the player needs to choose frame V2-a or V2-b based on the matching with a given key. For example, a player which received Key-a decrypts and plays frame V2-a. In stream 1B, frames in ES 730 overlap with frames in ES 740. Thus, in stream 1B, the selection of individualization segment can be done at the unit of one or more encryption block. The player will need to choose encryption block based on the matching with a given key. Thus, these blocks can exist in one file, or can be stored as separate files and played continuously. The player which received Key-a decrypts the block which includes V2-a, while the player which receive Key-b decrypts the block which includes V2-b.

Regarding FIG. 7, although the illustration 700 is based on a frame-based video watermarking, other means such as longer length video marking or audio watermarking can be applied through the same segmentation approach. The multiplexing layer (such as MP4 header and other container format layer) is omitted to simplify the illustration 700. Further, frames V2-a and V2-b may have different video watermark inserted. Thus, the payload for storing information can be provided by having multiple segments individualized across the entire content sequence.

Figure 8:
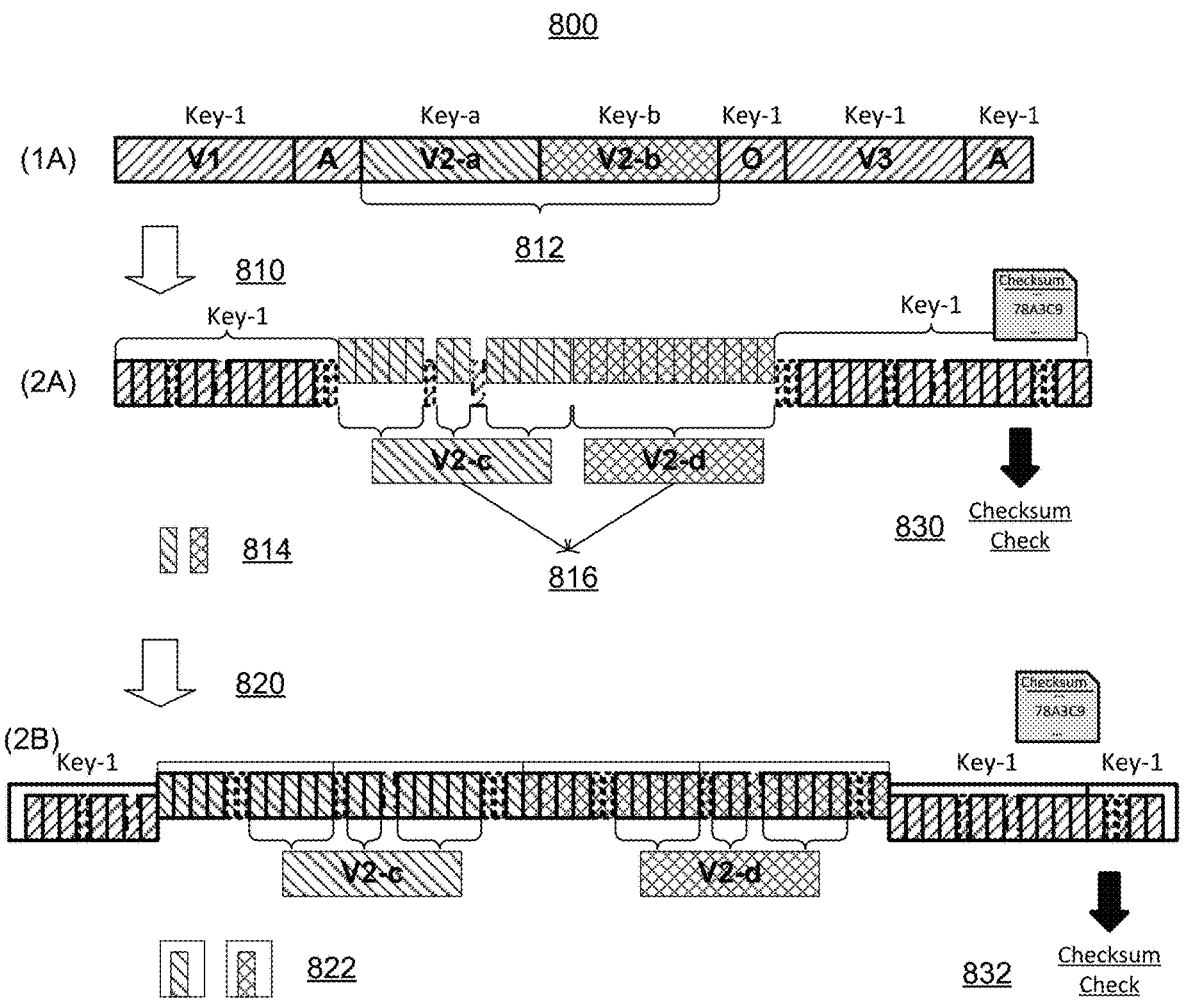
FIG. 8 is an illustration of a process for converting from "frame base" to "fixed-size packet" and comparing checksums by providing alternative data for the use after the conversion.

FIG. 8 is an illustration of a process 800 for converting from "frame base" to "fixed-size packet" and comparing checksums at a client device. The conversion is performed by providing alternative data for the use after the conversion. The conversion case 810 is a conversion from stream 1A to stream 2A, while case 820 is a conversion from stream 1A to stream 2B. In either case 810 or 820, the original variation of the video data is discarded and the separately-prepared already-encrypted video data is used. The content author prepares V2-c and V2-d portion of the data format (stream 2A or 2B) separately from the original format stream (stream 1A), and provides V2-c and V2-d portions of the data as a separate file on the media or from the server.

As stated above, in either case 810 or 820, the conversion process discards V2-a and V2-b portions from original video data (see 812), and inserts V2-c and V2-d data as replacements (see 816). Packets 814 make up separately prepared encrypted video variations (video ES encrypted in fixed-size packets). Blocks 822 make up separately prepared encrypted blocks (including video variations). Data V2-c or V2-d may or may not be the same video data as V2-a/V2-b, and may or may not be encrypted with same keys as V2-a/V2-b. The playback license for data format (2A)/(2B) may provide different set of keys compared to the keys used for data format (1A). By providing already encrypted separate variation data for data format (2A)/(2B), the conversion process does not need to expose the video data of V2-a/V2-b and can maintain the uniqueness of a forensic WM identifier in the decrypted image which was associated with the set of keys given to a particular player. In one implementation, once the conversion process is completed, a checksum is generated and compared to the checksum received from a content provider server, at block 830 (for stream 2A) or 832 (for stream 2B). In other implementations, the checksum comparison can be performed during the conversion process.

Figure 9:
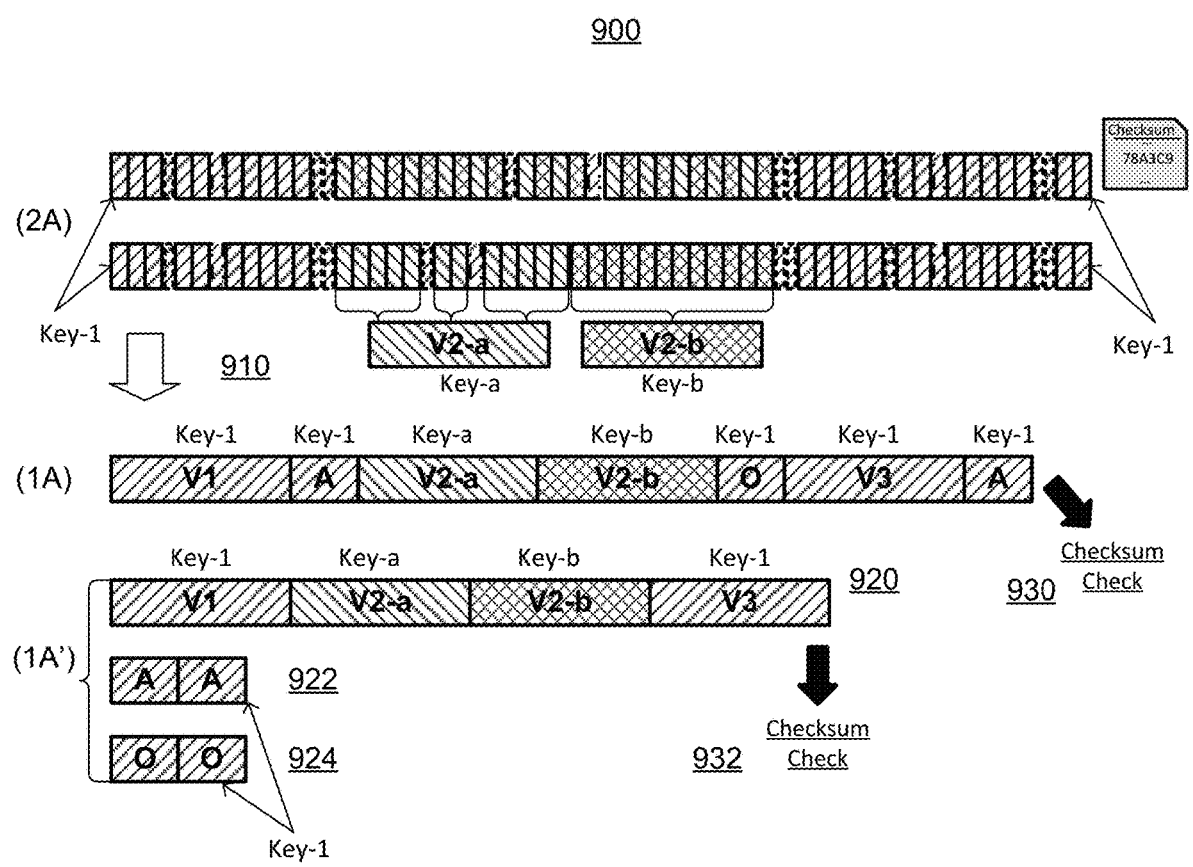
FIG. 9 is an illustration of a process for converting from "fixed-size packet" to "frame base" and comparing checksums by re-using all of the same video data included in the original stream.

FIG. 9 is an illustration of a process 900 for converting from "fixed-size packet" to "frame base" and comparing checksums at a client device. The conversion is performed by re-using all of the same video data included in the original stream. The conversion case 910 is a conversion from stream 2A to stream 1A in which the encrypted video data is preserved. Further, the video data is re-multiplexed from the "fixed-size packet" format (e.g. MPEG-TS) to the "frame base" format (e.g. MP4). The audio data and other data will be also re-multiplexed into the "frame base" format in the same manner. The conversion output file (format 1A') in the "frame base" format can be separate track files with video 920, audio 922, and other data 924. Once the conversion process is completed, a checksum is generated and compared to the checksum received from a content provider server, at block 930 (for format 1A) or 932 (for format 1A'). In other implementations, the checksum comparison can be performed during the conversion process.

Figure 10:
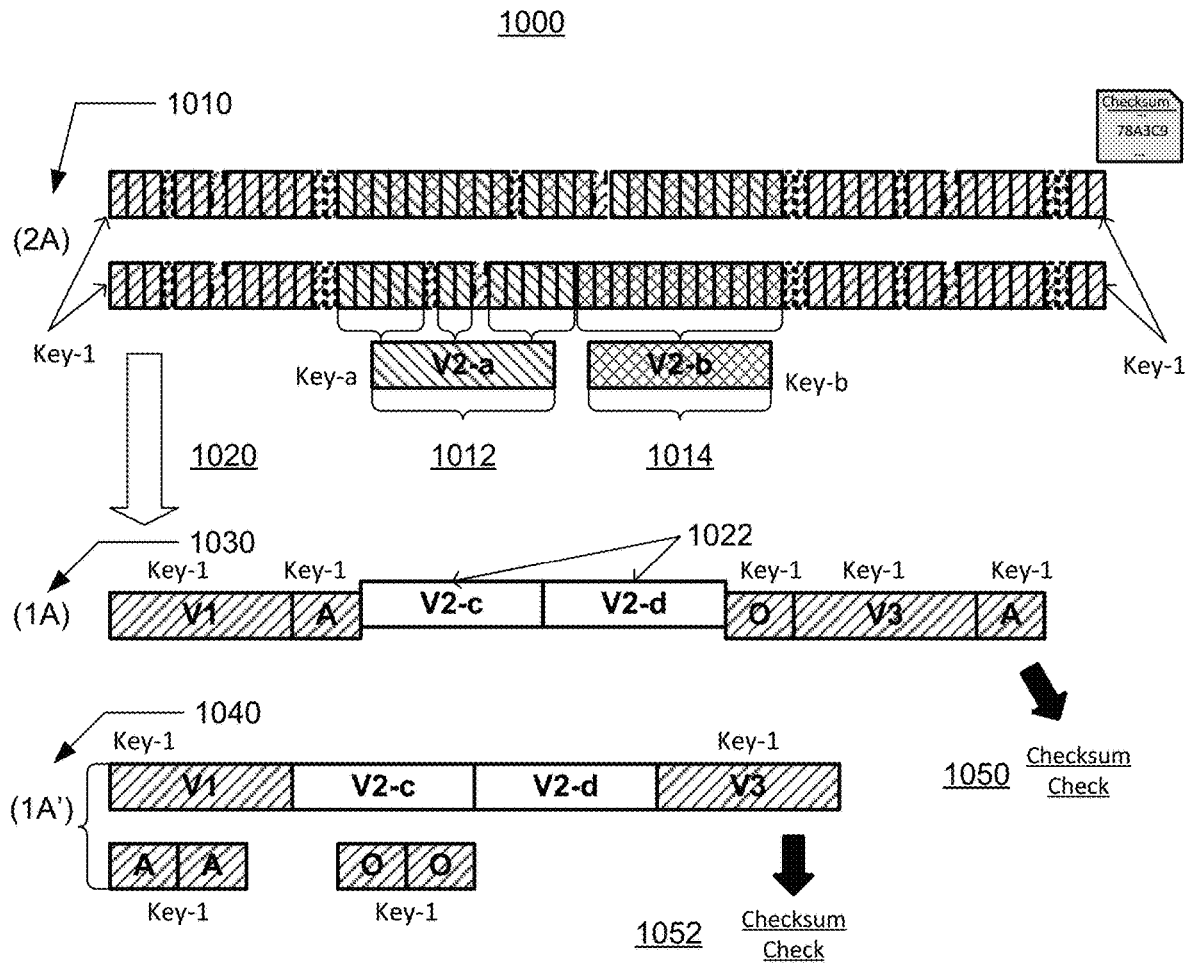
FIG. 10 is an illustration of a process for converting from the "fixed-size packet" format to the "frame base" format and comparing checksums by providing alternative data for the use after the conversion.

FIG. 10 is an illustration of a process 1000 for converting from the "fixed-size packet" format 1010 to the "frame base" format 1030 and comparing checksums at a client device. The conversion is performed by providing alternative data for the use after the conversion. The conversion case 1020 is a conversion from stream 2A 1010 to stream 1A 1030 in which the original variation of the video data is reused. For playback, either one of the video variations (V2-a or V2-b) is decryptable by a particular player unit which has only one key assigned to one of the variations. The content author prepares V2-c and V2-d portion of the data format stream (1A) separately from the original format stream (2A) and provide V2-c and V2-d portions of the data as a separate file on the media or from a server. Thus, blocks 1522 make up separately prepared encrypted blocks (including video variations).

The conversion process 1020 discards V2-*a* 1012 and V2-*b* 1014 portions from the original video data and inserts V2-*c* and V2-*d* data as replacements. V2-*c*/V2-*d* may or may not be the same video data as V2-*a*/V2-*b*, and may or may not be encrypted with same keys as V2-*a*/V2-*b*. The playback license for data format (1A) may provide a different set of keys compared to the keys used for data format (2A). By providing already encrypted separate variation data for data format (1A), the content author may be able to use different techniques to prepare variations dedicated for data formats (2A) and (1A). The playback of data format (2A) and (1A) also can be managed by a different set of keys, and potentially use different watermark identifiers in a decrypted image. Thus, the conversion output file can be separate track files with each of the video, audio, and others data units as shown in format (1A') 1040. In one implementation, once the conversion process is completed, a checksum is generated and compared to the checksum received from a content provider server, at block 1050 (for format 1A) or 1052 (for format 1A'). In other implementations, the checksum comparison can be performed during the conversion process.

Figure 11:
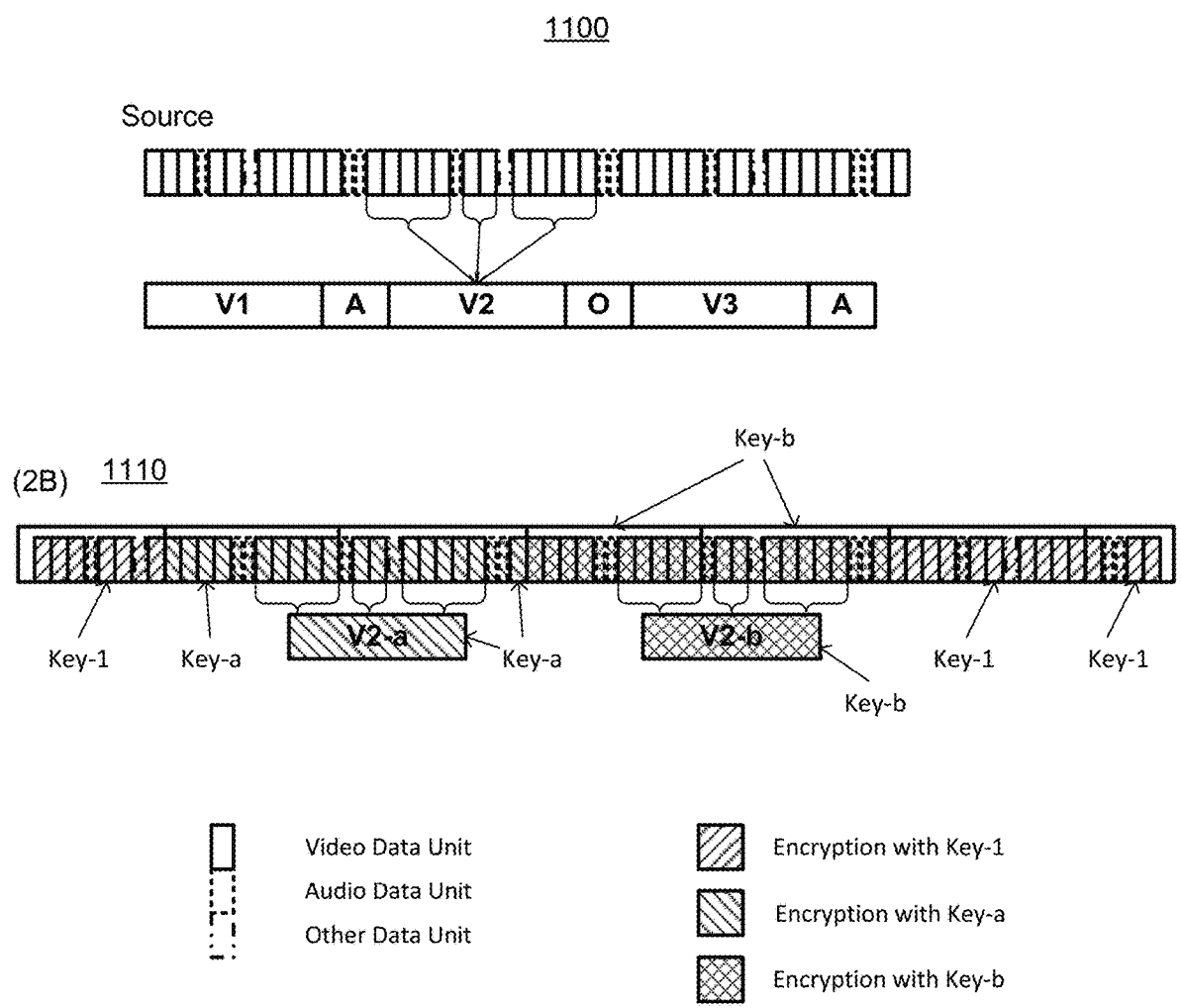
FIG. 11 is an illustration of a media format with multi-plexed video, audio, and other data units in a fixed-size packet in accordance with one implementation.

FIG. 11 is an illustration 1100 of a media format with multiplexed video, audio, and other data units in a fixed-size packet in accordance with one implementation. The multiplexing is applied in a fixed-sized packet (e.g., an MPEG-TS based broadcasting in Blu-ray Disc Format). In this implementation, the individualization can be applied by frame basis (or larger units), but consideration for the fixed-size packet sequence is needed. In a case in which encryption is also applied on a frame basis (e.g., stream 2A), encryption does not affect selection of the individualization segment. In a case in which an encryption unit overlaps with different types of elementary streams (e.g., stream 2B 1110), the selection of individualization segment can be done at the unit of one or more encryption block.

Although the illustration 1100 is based on a frame-based video watermarking, other means such as longer length video marking or audio watermarking can be applied through the same segmentation approach. The multiplexing layer (such as MPEG-TS header and other container format layer) is omitted to simplify the illustration 1100. Further, frames V2-*a* and V2-*b* may have different video watermark inserted. The payload for storing information can be provided by having multiple segments individualized across the entire content sequence. Thus, the individualization can be applied to the encryption block(s) where the target video frame (V2 in FIG. 11) is included. Individualized segments may include other video frame data or audio data. These blocks can exist in one file, or can be stored as separate files and played continuously.

Figure 12:
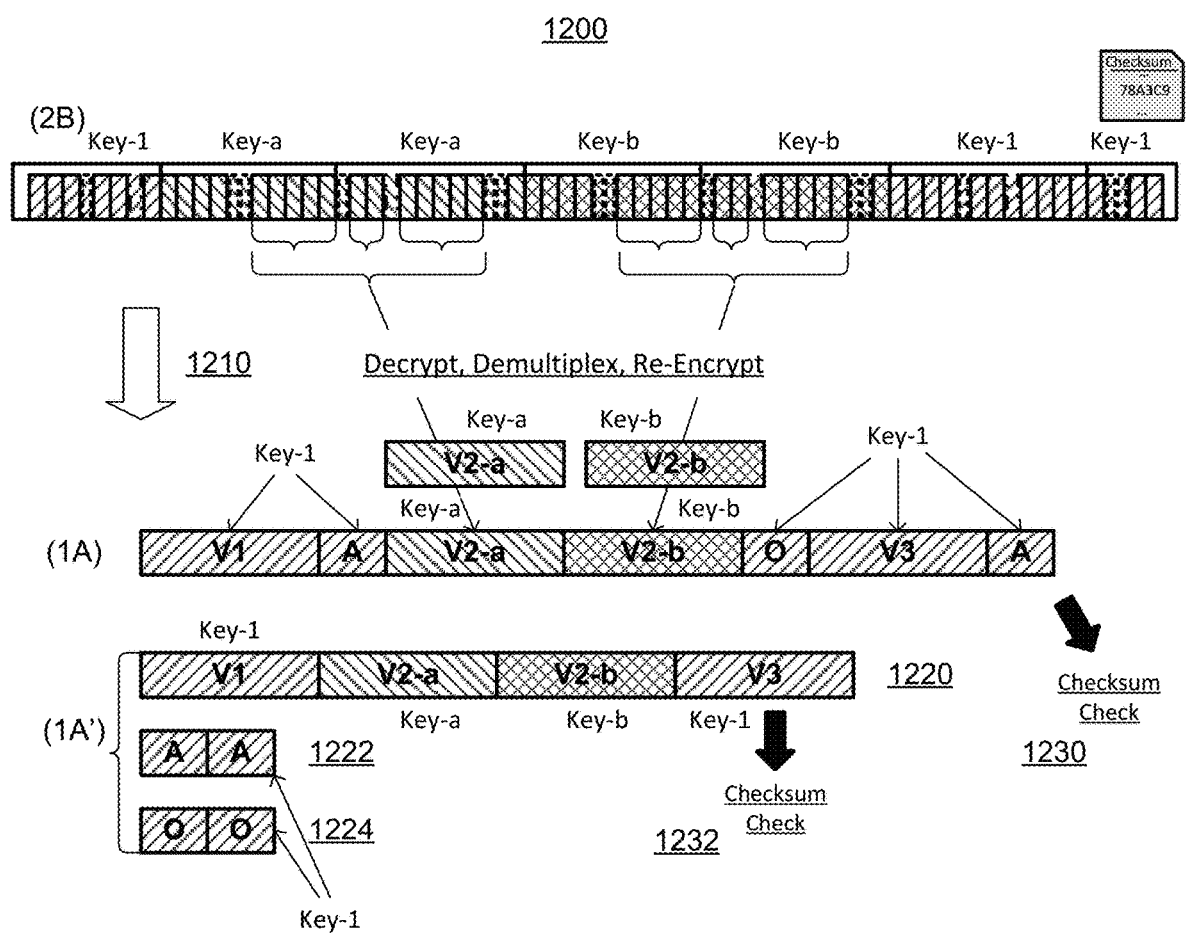
FIG. 12 is an illustration of a process for converting from "fixed-size packet" to "frame base" and comparing checksums by re-using all of the same video data included in the original stream.

FIG. 12 is an illustration of a process 1200 for converting from "fixed-size packet" to "frame base" and comparing checksums at a client device. The conversion is performed by re-using all of the same video data included in the original stream. The conversion case 1210 is a conversion from stream 2B to stream 1A in which the original variation of the video data is reused. The original encryption block data in format (2B) is decrypted and the video data is de-multiplexed. Further, the encryption is applied to the video ES layer, thus, re-multiplexing to the "frame base" format (also see FIG. 5). The conversion output file (format 1A') in the "frame base" format can be separate track files with video 1220, audio 1222, and other data 1224. In one implementation, once the conversion process is completed, a checksum is generated and compared to the checksum received from a content provider server, at block 1230 (for format 1A) or 1232 (for format 1A'). In other implementations, the checksum comparison can be performed during the conversion process.

Figure 13:
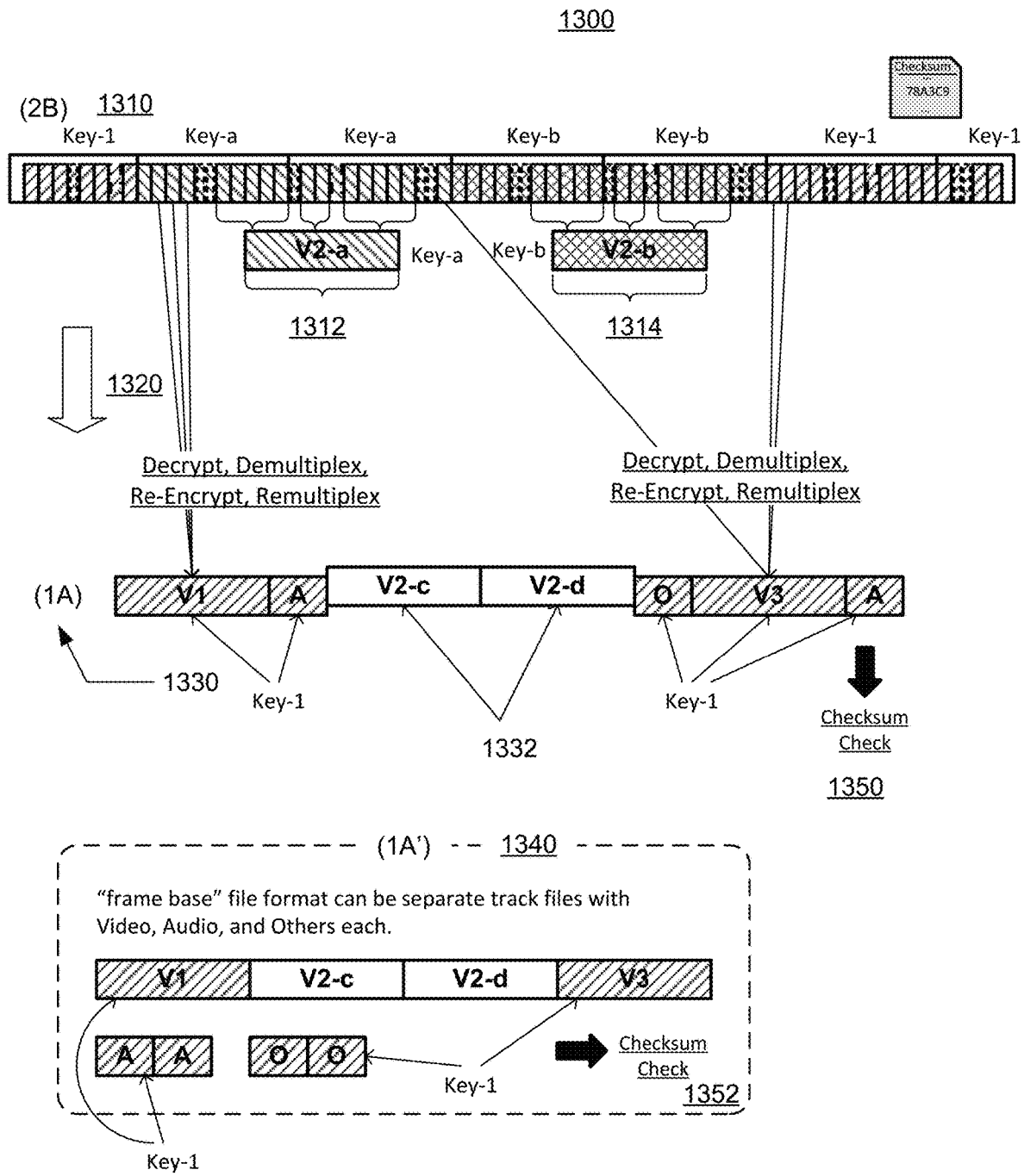
FIG. 13 is an illustration of a process for converting from the "fixed-size packet" format to the "frame base" format and comparing checksums by providing alternative data for the use after the conversion.

FIG. 13 is an illustration of a process 1300 for converting from the "fixed-size packet" format 1310 to the "frame base" format 1330 and comparing checksums at a client device. The conversion is performed by providing alternative data for the use after the conversion. The conversion case 1320 is a conversion from stream 2B 1310 to stream 1A 1330 in which the video data is reused. For playback, either one of the video variations (V2-*a* or V2-*b*) is decryptable by a particular player unit which has only one key assigned to one of the variations. The content author prepares V2-*c* and V2-*d* portion of the data format stream (1A) separately from the original format stream (2B) and provide V2-*c* and V2-*d* portions of the data as a separate file on the media or from a server. Thus, blocks 1332 make up separately prepared encrypted blocks (including video variations).

The conversion process 1320 discards V2-*a* 1312 and V2-*b* 1314 portions from the original video data and inserts V2-*c* and V2-*d* data 1332 as replacements. V2-*c*/V2-*d* may or may not be the same video data as V2-*a*/V2-*b*, and may or may not be encrypted with same keys as V2-*a*/V2-*b*. The playback license for data format (1A) may provide a different set of keys compared to the keys used for data format (2B). By providing already encrypted separate variation data for data format (1A), the content author may be able to use different techniques to prepare variations dedicated for data formats (2B) and (1A). The playback of data format (2B) and (1A) also can be managed by a different set of keys, and potentially use different watermark identifiers in a decrypted image.

For the portions where there is no variation of video in the original data (2B), the conversion process 1320 needs to decrypt the original encryption block data in format (2B) and demultiplex the video data. Further, the encryption is applied to the video ES layer, thus, re-multiplexing to the "frame base" format. For the portions where there is no variation of video in the original data (2B), there is a benefit to using the original data as it typically occupies most of the size of original (2B) data. Thus, reusing the video data in this manner can minimize the size of separately prepared data 1332. Thus, the conversion output file can be separate track files with each of the video, audio, and others data units as shown in format (1A') 1340.

In one implementation, once the conversion process is completed, a checksum is generated and compared to the checksum received from a content provider server, at block 1350 (for format 1A) or 1352 (for format 1A'). In other implementations, the checksum comparison can be performed during the conversion process.

Figure 14:
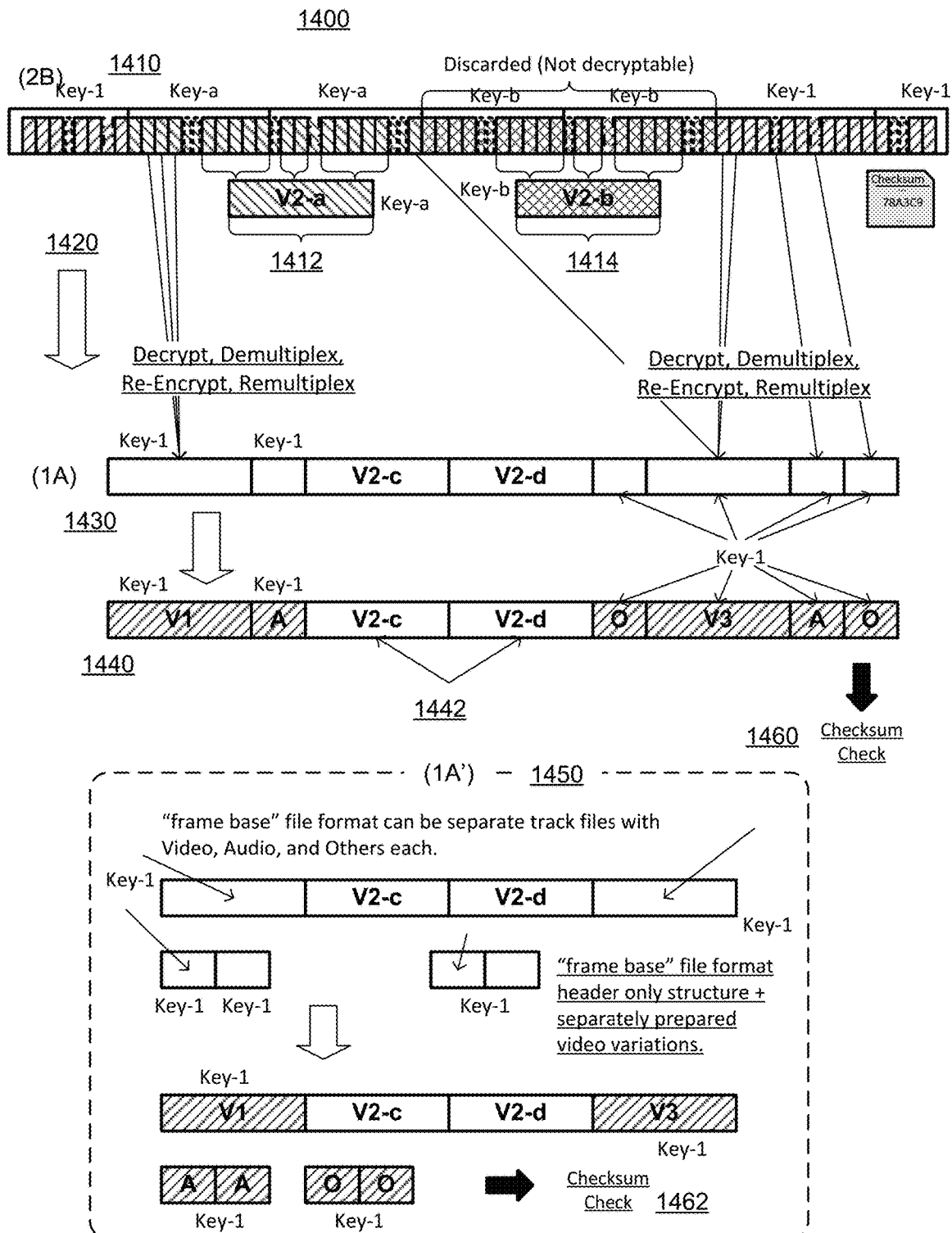
FIG. 14 is an illustration of a process to include separately prepared video variations in the conversion output file format header files.

FIG. 14 is an illustration of a process 1400 to include separately prepared video variations in the conversion output file format header files. The content author prepares the "frame base" file format header only structure including separately prepared encrypted video variations (V2-*c*/V2-*d*). The conversion process 1420 decrypts, de-multiplexes, re-encrypts, and re-multiplexes data from the original (2B) file format 1410. The conversion process 1420 has access to a key which can decrypt only the blocks which includes V2-*a* or V2-*b* (but not both). The conversion process 1420 re-encrypts and re-multiplexes the data other than V2-*a* portion 1412, and uses V2-*c* and V2-*d* already separately prepared data 1442 instead of V2-*a*/V2-*b* 1412, 1414. The existence of separately prepared V2-*c*/V2-*d* data itself may be used to identify where the original video data needs to be discarded. V2-*c*/V2-*d* may be two separate video frames encrypted separately or are one video frame and metadata structure depending on the format of (1A) 1430, 1440 and (1A') 1450.

In one implementation, once the conversion process is completed, a checksum is generated and compared to the checksum received from a content provider server, at block 1460 (for format 1A) or 1462 (for format 1A'). In other implementations, the checksum comparison can be performed during the conversion process.

One implementation includes one or more programmable processors and corresponding computer system components to store and execute computer instructions. Combinations of hardware, software, and firmware can also be used. For example, in the provider system, distribution, and playback, the encryption of data, building and distribution of content files, conversion, and generating checksums can be performed by one or more computer systems executing appropriate computer instructions on one or more processors utilizing appropriate components and systems (such as memory, computational units, buses, etc.).

Additional variations and implementations are also possible. While several examples address content files and data representing video, such as a movie or television program, other data can also be used, such as audio, image data, software, scientific or medical data, etc. In one example, patient medical records are segmented, marked, encrypted, converted, and checksums are created and used as discussed here. Similar to verifying AV content, distributing and comparing checksums to confirm the accuracy of conversions of other data (such as medical imaging data) can help to improve patient care and reduce costs.

The above description of the disclosed implementations is provided to enable any person skilled in the art to make or use the disclosure. Various modifications to these implementations will be readily apparent to those skilled in the art, and the generic principles described herein can be applied to other embodiments without departing from the spirit or scope of the disclosure. Accordingly, the techniques are not limited to the specific examples described above. Thus, it is to be understood that the description and drawings presented herein represent a presently preferred embodiment of the disclosure and are therefore representative of the subject matter that is broadly contemplated by the present disclosure. It is further understood that the scope of the present disclosure fully encompasses other embodiments that may become obvious to those skilled in the art and that the scope of the present disclosure is accordingly limited by nothing other than the appended claims.

The invention claimed is:

1. A method for content conversion verification for a secondary use of an original content file, comprising:
   converting, at a first computer system, the original content file to a target format to generate a converted content file in the target format;
   generating a checksum for the converted content file; and
   sending the original content file and the checksum to a second computer system,
   wherein the original content file is sent only once to the second computer system but the checksum is generated and sent to the second computer system every time the secondary use of the original content file is requested by the second computer system,
   wherein the original content file is converted to the target format and a local checksum is generated for a file in the target format in the second computer system simultaneously so that the checksum received from the first computer system and the local checksum can be compared as soon as conversion and the generation process has started to verify in the second computer system that the conversion to the target format at the second computer system was successful.

2. The method of claim 1, wherein the first computer system is a content provider computer system.

3. The method of claim 1, wherein the second computer system is a client computer system.

4. The method of claim 1, wherein the original content file is a video data file.

5. The method of claim 1, wherein the original content file is encrypted.

6. The method of claim 5, wherein the original content file is converted to the target format without re-encrypting original content file or the converted content file.

7. The method of claim 1, wherein the original content file includes a watermark.

8. The method of claim 7, wherein the converted content file includes the watermark.

9. A method for content conversion verification for a secondary use of an original content file, comprising:
   receiving, at a first computer system, the original content file and a checksum from a second computer system,
   wherein the original content file is received only once from the second computer system but the checksum is generated and received from the second computer system every time the secondary use of the original content file is requested to the second computer system by the first computer system,
   wherein the received checksum was generated at the second computer system after the original content file was converted to a target format;
   converting, at the first computer system, the received original content file to the target format to generate a converted content file in the target format;
   generating, at the first computer system, a new checksum for the converted content file while the original content file is being converted to the target format; and
   comparing, at the first computer system, the received checksum second computer system and the new checksum as soon as converting and generating has started to verify that the conversion of the original content file to the target format at the first computer system was successful.

10. The method of claim 9, wherein the original content file is encrypted, and converting the original content file does not include decrypting the original content file.

11. The method of claim 9, wherein the received original content file is segmented into a plurality of chunks so that generating the new checksum and comparing the received checksum and the new checksum are performed during the conversion of the original content file to the target format.

12. The method of claim 9, further comprising
   generating a verification flag when the comparison of the received checksum and the new checksum match.

13. The method of claim 9, further comprising
   sending to the second computer system a request for a new original content file when the received checksum and the new checksum do not match.

14. The method of claim 9, further comprising
   sending to the second computer system the new checksum when the received checksum and the new checksum do not match.

15. An apparatus for content conversion verification for a secondary use of an original content file, comprising:
   means for receiving, at a first computer system, the original content file and a checksum from a second computer system, wherein the original content file is received only once from the second computer system but the checksum is generated and received from the second computer system every time the secondary use of the original content file is requested to the second computer system by the first computer system, wherein the received checksum was generated at the second computer system after the original content file was converted to a target format;

means for converting, at the first computer system, the received original content file to the target format to generate a converted content file in the target format;

means for generating, at the first computer system, a new checksum for the converted content file while the original content file is being converted to the target format; and means for comparing to compare, at the first computer system, the received checksum received from the second computer system and the new checksum as soon as converting and generating has started to verify that the conversion of the original content file to the target format at the first computer system was successful.

16. The apparatus of claim 15, wherein the original content file is encrypted, and the means for converting the original content file does not include means for decrypting the original content file.

17. The apparatus of claim 15, wherein the means for generating a new checksum is performed during the conversion of the original content file to the target format.

18. The apparatus of claim 15, further comprising
means for generating a verification flag when the comparison of the received checksum and the new checksum match.

19. The apparatus of claim 15, further comprising
means for sending to the second computer system a request for a new original content file when the received checksum and the new checksum do not match.

20. The apparatus of claim 15, further comprising
means for sending to the second computer system the new checksum when the received checksum and the new checksum do not match.

21. A non-transitory computer-readable medium storing a computer program to verify content conversion for a secondary use of an original content file, the computer program comprising executable instructions that cause a computer to:

receive, at a first computer system, the original content file and a checksum from a second computer system, wherein the original content file is received only once from the second computer system but the checksum is generated and received from the second computer system every time the secondary use of the original content file is requested to the second computer system by the first computer system, wherein the received checksum was generated at the second computer system after the original content file was converted to a target format;

convert, at the first computer system, the received original content file to the target format to generate a converted content file in the target format;

generate, at the first computer system, a new checksum for the converted content file while the original content file is being converted to the target format; and compare, at the first computer system, the received checksum received from the second computer system and the new checksum as soon as converting and generating has started to verify that the conversion of the original content file to the target format at the first computer system was successful.

22. An apparatus to verify content conversion for a secondary use of an original content file, the apparatus comprising:

a processor; and memory connected to the processor, the memory storing a computer program to verify content conversion, the computer program comprising instructions executable by the processor that cause the apparatus to:

receive the original content file and a checksum from a computer system, wherein the original content file is received only once from the second computer system but the checksum is generated and received from the second computer system every time the secondary use of the original content file is requested to the second computer system by the first computer system, wherein the received checksum was generated after the original content file was converted to a target format outside of the computer system;

convert the original content file to the target format to generate a converted content file in the target format;

generate a new checksum for the converted content file while the original content file is being converted to the target format; and compare the received checksum received from the second computer system and the new checksum as soon as converting and generating has started to verify that the conversion of the original content file to the target format at the computer system was successful.

23. The apparatus of claim 22, wherein the apparatus is a media player.

* * * * *